United States Patent
Lou et al.

(10) Patent No.: US 7,522,545 B2
(45) Date of Patent: Apr. 21, 2009

(54) WIRELESS PERIPHERAL SYSTEM FOR USE WITH COMPUTER

(75) Inventors: Chin-Kuan Lou, Taipei (TW); Chun-Nan Su, Taipei (TW)

(73) Assignee: Primax Electronics Ltd., Neihu, Taipei (TW)

(*) Notice: Subject to any disclaimer, the term of this patent is extended or adjusted under 35 U.S.C. 154(b) by 322 days.

(21) Appl. No.: 11/150,075

(22) Filed: Jun. 10, 2005

(65) Prior Publication Data

US 2006/0253625 A1    Nov. 9, 2006

(30) Foreign Application Priority Data

May 6, 2005    (TW)    .............................. 94114683 A

(51) Int. Cl.
*H04B 7/00*    (2006.01)
(52) U.S. Cl. ...................... 370/310; 370/277; 455/41.2; 455/41.3
(58) Field of Classification Search ................. 370/310, 370/277; 455/41.2, 41.3, 556.1, 557, 569.1, 455/575.2
See application file for complete search history.

(56) References Cited

U.S. PATENT DOCUMENTS

| | | | |
|---|---|---|---|
| 5,923,705 A * | 7/1999 | Willkie et al. ............... | 375/220 |
| 7,137,048 B2 * | 11/2006 | Zerbe et al. .................. | 714/715 |
| 7,231,451 B2 * | 6/2007 | Law et al. ..................... | 709/230 |
| 7,328,671 B2 * | 2/2008 | Kates ........................... | 119/720 |
| 2003/0083013 A1 * | 5/2003 | Mowery et al. ................ | 455/41 |
| 2004/0077317 A1 * | 4/2004 | Boarin et al. .................. | 455/86 |
| 2004/0109551 A1 * | 6/2004 | Simpson et al. ......... | 379/215.01 |
| 2005/0059346 A1 * | 3/2005 | Gupta et al. ................ | 455/41.2 |
| 2005/0096086 A1 * | 5/2005 | Singamsetty ................. | 455/557 |
| 2006/0014565 A1 * | 1/2006 | Chen ........................... | 455/557 |
| 2006/0062400 A1 * | 3/2006 | Chia-Chun .................... | 381/74 |
| 2006/0149870 A1 * | 7/2006 | Sears et al. .................... | 710/71 |

FOREIGN PATENT DOCUMENTS

WO    WO 00/24185    *    4/2000

* cited by examiner

*Primary Examiner*—Nay A Maung
*Assistant Examiner*—Andrew Wendell
(74) *Attorney, Agent, or Firm*—Winston Hsu

(57) ABSTRACT

A wireless peripheral system for use with a computer includes a wireless signal transceiver controller and two peripheral devices. These peripheral devices include a human input device and an audio receive/transmit device, which are in communication with the computer via the wireless signal transceiver controller so as to communicate with the computer in a wireless transmission manner.

15 Claims, 5 Drawing Sheets

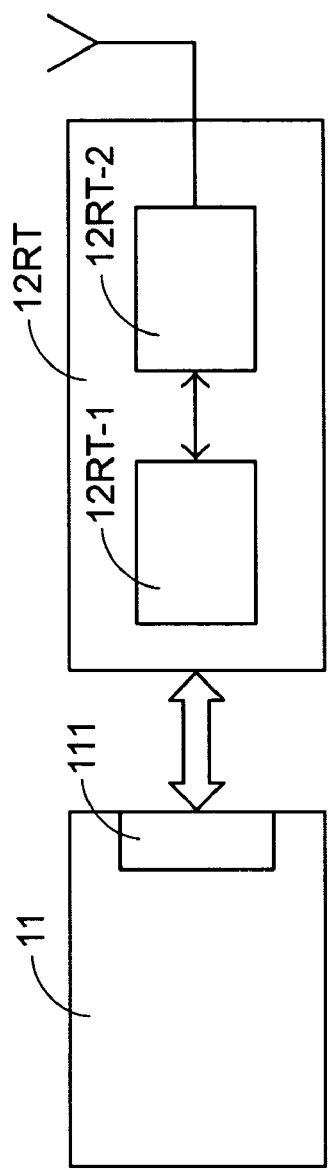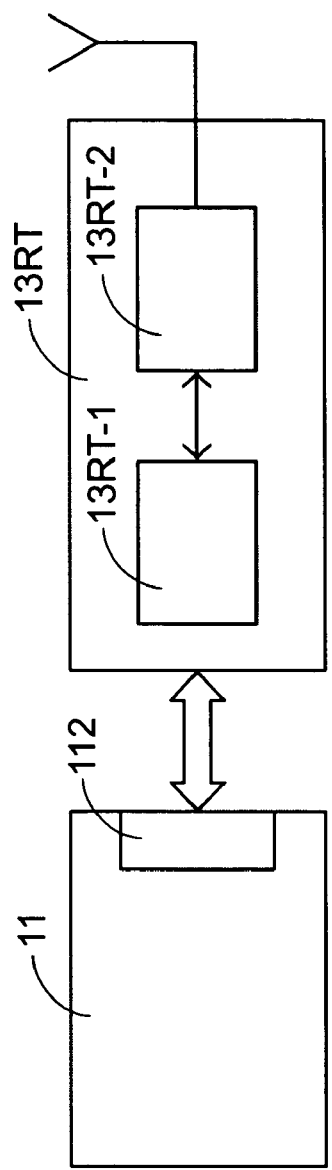

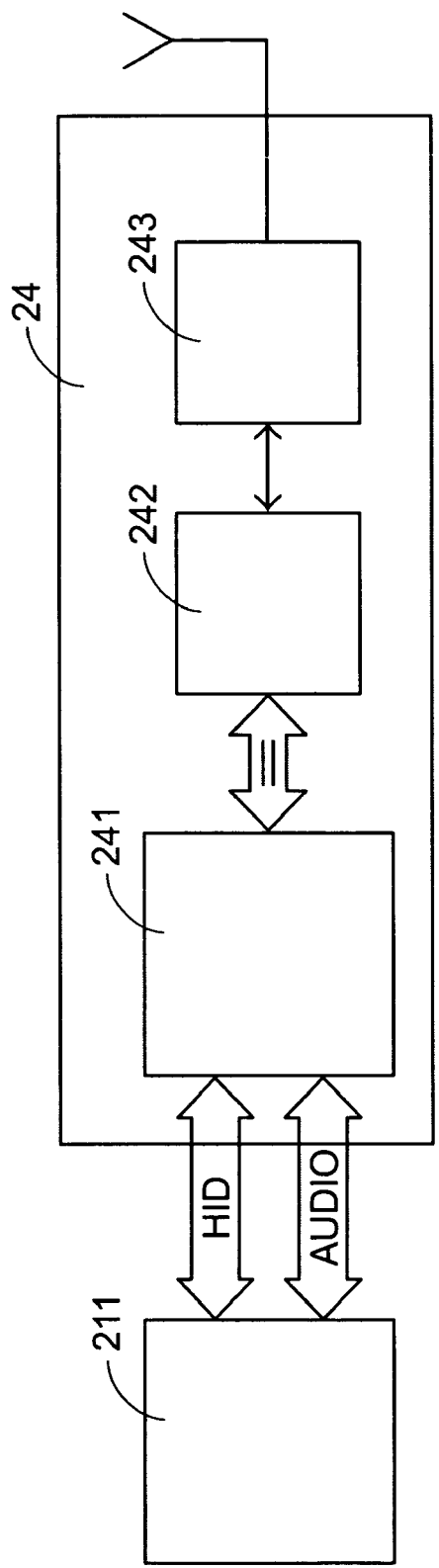
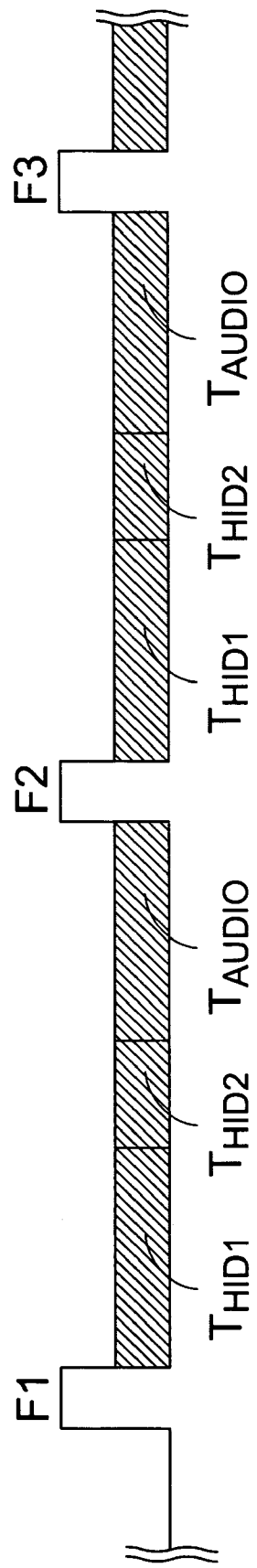
Fig.5
Fig.6

US 7,522,545 B2

WIRELESS PERIPHERAL SYSTEM FOR USE WITH COMPUTER

FIELD OF THE INVENTION

The present invention relates to a wireless peripheral system for use with a computer, and more particularly to a wireless peripheral system for communicating a human input device (HID) and an audio device with a computer by using a single wireless signal transceiver controller.

BACKGROUND OF THE INVENTION

Human input devices (HIDs) such as mice, keyboard or joysticks become essential peripheral input devices because the user can input signals for controlling the computer, e.g. the signals for controlling movement of the cursor, and input data into the computer via these human input devices. Nowadays, wireless communication technologies have experienced great growth and are now rapidly gaining in popularity. The common wireless communication protocols are usually operated in the bandwidth of 27 MHz, 2.4 GHz or the Bluetooth band, and thus these human input devices can be communicated with the computer in a wireless transmission manner.

In addition to the above human input devices for inputting data therevia, the peripheral devices for receiving and transmitting the audio signals (e.g. songs) from/to the computer are gradually adopted. Generally, the user may use an earphone or an audio device having both the functions of an earphone and a microphone to listen to the songs played from the computer. Otherwise, by means of this peripheral device, an internet phone service is established to make PC-to-phone calls by simple software such as a Skype program.

Referring to FIG. 1, a schematic view of a conventional wireless peripheral system is illustrated. The conventional wireless peripheral system is cooperatively used with a computer screen 10 and a host computer 11. This conventional wireless peripheral system further comprises a wireless human input device 12, a human input device transceiver 12RT, a wireless audio receive/transmit device 13 and a wireless audio transceiver 13RT. The wireless human input device 12 includes a wireless keyboard 12-1 and a wireless mouse 12-2. The human input device transceiver 12RT is electrically connected to the host computer 11. An exemplary wireless audio receive/transmit device 13 is a microphone/earphone device. The wireless audio transceiver 13RT is also electrically connected to the host computer 11. In some cases, each of the wireless mouse and the wireless keyboard uses a corresponding wireless signal transceiver.

The wireless human input device 12 is communicated with the host computer 11 in a wireless transmission manner when the human input device transceiver 12RT is electrically connected to the connection port 111 of the host computer 11. Whereas, the microphone/earphone device 13 is communicated with the host computer 11 in a wireless transmission manner when the wireless audio transceiver 13RT is electrically connected to the connection port 112 of the host computer 11.

Referring to FIG. 2, a schematic circuit block diagram of the human input device transceiver 12RT according to the prior art is shown. As shown in FIG. 2, the human input device transceiver 12RT is connected to the connection port 111 of the host computer 11. An example of the connection port 111 is a low speed USB port. The human input device transceiver 12RT comprises a low speed USB interface control chip 12RT-1 and a wireless signal transceiver 12RT-2. The data from the low speed USB port 111 are received and processed by the low speed USB interface control chip 12RT-1, and then the processed data are transmitted to the wireless signal transceiver 12RT-2 in a serial transmission manner.

Referring to FIG. 3, a schematic circuit block diagram of the wireless audio transceiver 13RT according to the prior art is shown. As shown in FIG. 3, the wireless audio transceiver 13RT is connected to the connection port 112 of the host computer 11. An example of the connection port 112 is a full speed USB port. The wireless audio transceiver 13RT comprises a full speed USB interface control chip 13RT-1 and a wireless signal transceiver 13RT-2. The data from the full speed USB port 112 are received and processed by the full speed USB interface control chip 13RT-1, and then the processed data are transmitted to the wireless signal transceiver 13RT-2 in a serial transmission manner.

As known from the wireless peripheral system of FIG. 1, if the user is intended to use the wireless human input device 12 and the wireless audio receive/transmit device 13, two wireless signal transceiver 12RT and 13RT should be available at the same time. Since the speed required for processing the audio signals is higher than that for processing the human input device signals, the wireless audio transceiver is more expensive than the wireless human input device. In other words, if the user only has a low economic ability to purchase only one wireless device, the user may choose the wireless human input device 12 and the human input device transceiver 12RT, which are more cost-effective and popular than the wireless audio receive/transmit device 13. Whereas, the audio signals will be received and transmitted by a wired audio device.

With increasing popularity of the Internet phones and the Internet songs, utilization rates of the earphones and the microphones are also increased. Accordingly, most users are intended to receive and transmit the audio signals by using the wireless earphones and the microphones.

In views of the above-described disadvantages resulted from the prior art, the applicant keeps on carving unflaggingly to develop a novel wireless peripheral system for use with a computer according to the present invention through wholehearted experience and research.

SUMMARY OF THE INVENTION

It is an object of the present invention to provide a wireless peripheral system for use with a computer, in which the wireless human input device and the wireless audio receive/transmit device are more cost-effective.

In accordance with a first aspect of the present invention, there is provided a wireless peripheral system for use with a computer. The wireless peripheral system is communicated with a connection port of the computer and comprises a wireless signal transceiver controller, a first wireless peripheral device and a second wireless peripheral device. The wireless signal transceiver controller is electrically connected to the connection port of the compute. The wireless signal transceiver controller comprises a computer interface controller electrically connected to the connection port of the computer, a communication controller electrically connected to the computer interface controller and a wireless signal transceiver electrically connected to the communication controller. Data are transmitted from the computer interface controller to the communication controller in a parallel transmission manner, transmitted from the communication controller to the wireless signal transceiver in a serial transmission manner, and then transmitted from the wireless signal transceiver to outsides of the wireless signal transceiver controller via a wireless transmission manner. The first wireless peripheral device is in communication with the computer via the wireless signal transceiver controller so as to transmit computer pointing signals between the first wireless peripheral device and the computer. The second wireless peripheral device is in communication with the computer via the wireless signal transceiver controller so as to transmit audio signals between the second wireless peripheral device and the computer.

In a preferred embodiment, the connection port of the computer is a full speed universal serial bus (USB 2.0) connection port, and the computer interface controller is a full speed USB micro controller.

In an embodiment, the first wireless peripheral device is a mouse.

In another embodiment, the first wireless peripheral device includes a mouse and a computer keyboard.

In an embodiment, the second wireless peripheral device includes an earphone, and the audio signals are songs.

In another embodiment, the second wireless peripheral device includes an earphone and a microphone, and the audio signals are Internet phone communicating signals.

Preferably, the computer further comprises a user operation interface.

In an embodiment, the user operation interface comprises an Internet call notification setting, a song playing schedule setting, a broadcasting channel setting, a battery capacity indication of the wireless peripheral device, and an Internet phone dial setting.

In accordance with a second aspect of the present invention, there is provided a wireless peripheral system for use with a computer. The wireless peripheral system and a wireless peripheral device. The wireless peripheral device of this wireless peripheral system has dual functions of the human input device and the wireless audio receive/transmit device.

In an embodiment, the wireless peripheral device comprises a wired earphone and a mouse. The mouse comprises a numerical keyboard, an audio signal encoder and an audio signal receiving hole. The earphone is electrically connected to the mouse when plugged in the audio signal receiving hole.

In another embodiment, the wireless peripheral device comprises a wired earphone, a microphone coupled to the earphone, and a mouse. The mouse comprises a numerical keyboard, an audio signal encoder and an audio signal receiving hole. The earphone is electrically connected to the mouse when plugged in the audio signal receiving hole.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 2 is a schematic circuit block diagram of the wireless signal transceiver used in the human input device according to the prior art;

FIG. 3 is a schematic circuit block diagram of the wireless signal transceiver used in the wireless audio receive/transmit device according to the prior art;

FIG. 5 is a schematic circuit block diagram of the wireless signal transceiver controller used in the wireless peripheral system of FIG. 4;

FIG. 6 is a timing diagram illustrating the communication of the human input device and the audio receive/transmit device with the wireless signal transceiver controller.

DETAILED DESCRIPTION OF THE PREFERRED EMBODIMENT

Figure 1:
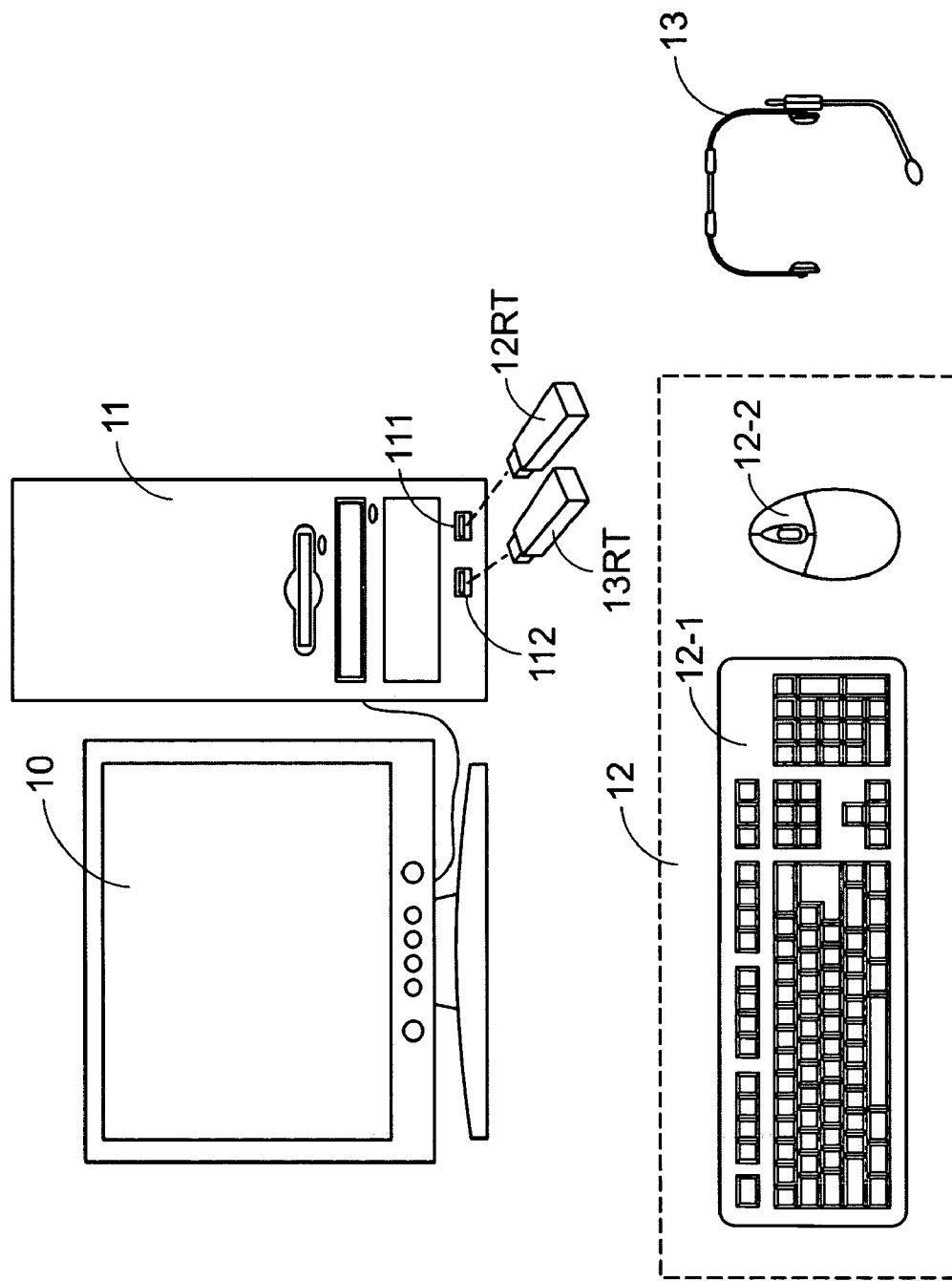
FIG. 1 is a schematic view of a conventional wireless peripheral system for use with a computer.
Figure 4:
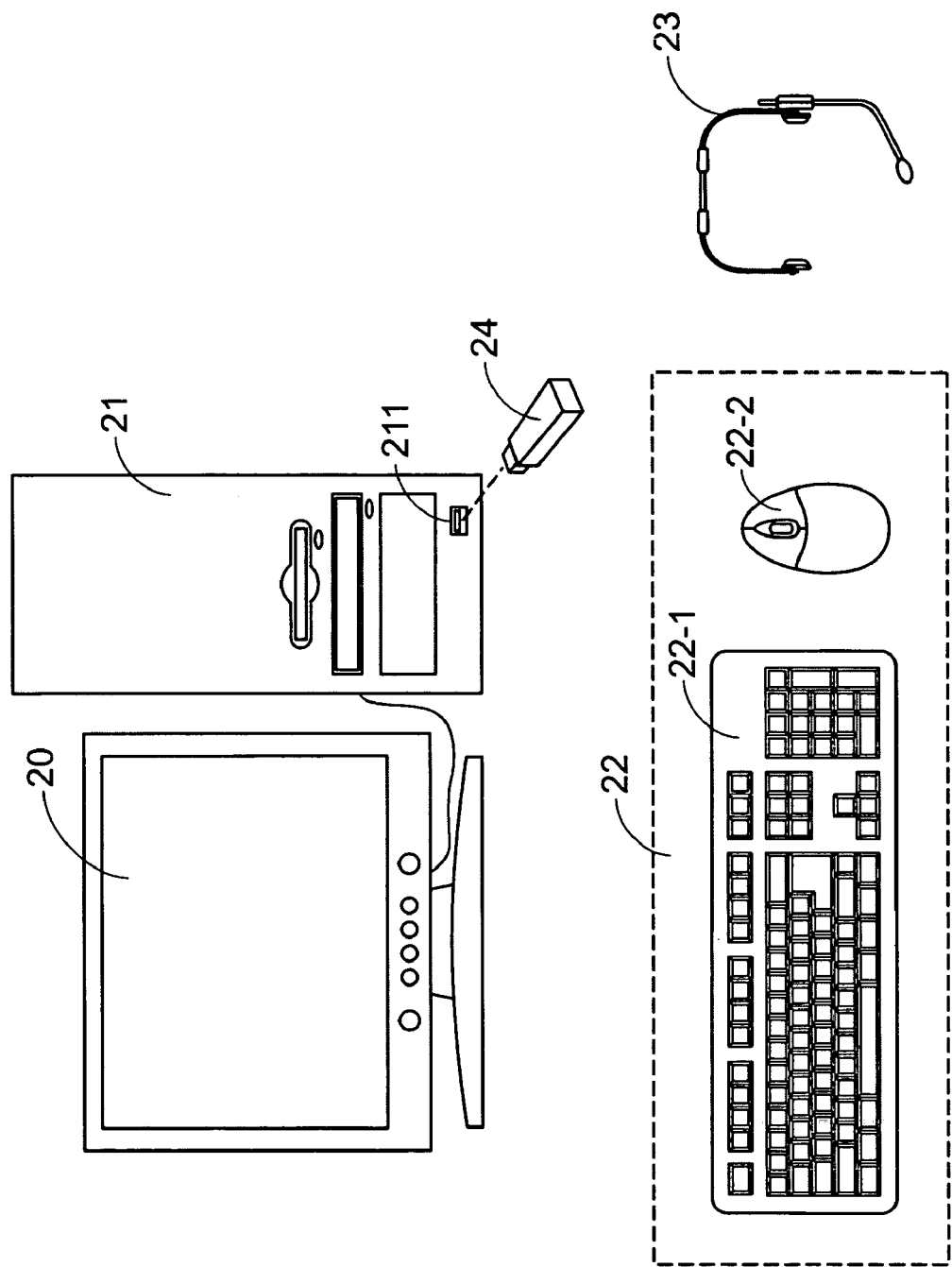
FIG. 4 is a schematic view of a wireless peripheral system for use with a computer according to a preferred embodiment of the present invention.

Referring to FIG. 4, a schematic view of a wireless peripheral system for use with a computer according to a preferred embodiment of the present invention is illustrated. The wireless peripheral system of FIG. 4 comprises a first peripheral device 22, a second peripheral device 23 and a wireless signal transceiver controller 24.

The first peripheral device 22 is a human input device (HID) for inputting the signals to control movement of the cursor on the computer screen 20 and inputting data into the computer via this human input device. In this embodiment, the first peripheral device 22 includes a wireless keyboard 22-1 and a wireless mouse 22-2. Alternatively, the first peripheral device 22 can include either of the wireless keyboard 22-1 and the wireless mouse 22-2. The second peripheral device 23 is a peripheral device for receiving and transmitting audio signals. An example of the second peripheral device 23 includes a wireless earphone device with a microphone. The first peripheral device 22 and the second peripheral device 23 are wirelessly communicated with the host computer 21 via the wireless signal transceiver controller 24, which is electrically connected to the connection port 211 of the host computer 21. An example of the connection port 211 is a full speed universal serial bus (USB 2.0) port operated at a speed of 12M bits/sec.

In accordance with the principal feature of the present invention, the human input device (HID) 22 and the audio receive/transmit device 23 are communicated with the host computer 21 via a common wireless signal transceiver controller 24 in a wireless transmission manner.

Referring to FIG. 5, a schematic circuit block diagram of the wireless signal transceiver controller 24 according to the present invention is illustrated. The wireless signal transceiver controller 24 of FIG. 5 comprises a full speed USB interface controller 241, a communication controller 242 and a wireless signal transceiver 243. The full speed USB interface controller 241 is electrically connected to the full speed USB port 211 of the host computer 21. The communication controller 242 is electrically connected to the full speed USB interface controller 241. The wireless signal transceiver 243 is electrically connected to the communication controller 242. An example of the communication controller 242 is a micro controller capable of writing a program therein.

The process for implementing the wireless peripheral system of the present invention will be illustrated with reference to FIGS. 4 and 5 in more details.

The data in a USB format are transmitted from the full speed USB port 211 to the full speed USB interface controller 241. Likewise, the data conforming to the full speed USB format may be transmitted from the full speed USB interface controller 241 to the full speed USB port 211. The communication controller 242 is employed to control timing of the HID data from the human input device (HID) 22 and the audio data from the audio receive/transmit device 23 such that the controlled data are then transmitted to the wireless signal transceiver 243. The wireless signal transceiver 243 are used to receive and transmit the wireless HID data and the wireless audio data.

First of all, the process for transmitting data from the host computer 21 to the first peripheral device 22 and the second peripheral device 23 is illustrated as follows.

The audio data in the USB format, for example stereophonic songs or Internet phone messages, are transmitted from the full speed USB port 211 to the full speed USB interface controller 241. The audio data in the USB format are converted into the data in an adaptive differential pulse code modulation (ADPCM) format by the USB interface controller 241. The audio data are transmitted to the communication controller 242 in a parallel transmission manner. The data from the communication controller 242 is then transmitted to the wireless signal transceiver 243 in a serial transmission manner, and then transmitted to the audio receive/transmit device 23 in a wireless transmission manner.

Secondly, the process for transmitting data from the human input device (HID) 22 and the audio receive/transmit device 23 to the host computer 21 will be illustrated as follows.

The communication controller 242 is employed to control the data transmission timing of the HID data from the human input device (HID) 22 and the audio data from the audio receive/transmit device 23. As shown from the timing diagram of FIG. 6, when a flag is hoisted, the wireless signal transceiver controller 24 will receive the data from the peripheral devices. For example, the time period between two flags F1 and F2 is divided into three time intervals $T_{HID1}$, $T_{HID2}$ and $T_{AUDIO}$. The keyboard 22-1 may transmit data during the time interval $T_{HID1}$. The mouse 22-2 may transmit data during the time interval $T_{HID2}$. Whereas, the audio receive/transmit device 23 will transmit data during the time interval $T_{AUDIO}$. The timing allocation for transmitting data in such a manner is known as a time division multiplex access (TDMA) technology.

The TDMA technology is widely used in various wireless communication applications and known to those skilled in the wireless communication art, and need not be redundantly described herein. Likewise, the technology involving in the USB data transmission is also known in the art.

For example, the data from the human input device (HID) 22 are similar to those generated from the conventional mouse and keyboard. Whereas, the data from the audio receive/transmit device 23 are for example the data for controlling playback, stop, start, volume control, previous/next track selection, communication voice. After these data are received by the wireless signal transceiver 243 and transmitted to the communication controller 242 in a serial transmission manner, the data are converted into desired format by the communication controller 242 and then transmitted to the USB interface controller 241 in a parallel transmission manner. Afterwards, the data are transmitted from the full speed USB interface controller 241 to the full speed USB port 211.

Please refer to FIGS. 2 and 3 again. As previously described, since the speed required for processing the human input device signals is lower than that for processing the audio signals, either the human input device transceiver 12RT for the human input device (HID) or the wireless audio transceiver 13RT for the audio receive/transmit device fails to be collectively used with the human input device (HID) and the audio receive/transmit device. In other words, the conventional human input device transceiver 12RT fails to meet the high data transmission speed requirement of the audio receive/transmit device. In addition, the conventional wireless audio transceiver 13RT fails to be collectively used with these two peripheral devices. Since the data amount and the data transmission speed for processing the audio signals by the audio receive/transmit device are much higher than those for processing the human input device signals, the full speed USB interface control chip 13RT-1 needs more resource to process the audio signals. In this circumstance, even if the HID data have been received by the full speed USB interface control chip 13RT-1, the resource of the full speed USB interface control chip 13RT-1 is occupied in order to process to audio data, and thus the HID data fail to be processed by the full speed USB interface control chip 13RT-1.

According to the present invention, for a purpose of allowing the human input device (HID) 22 and the audio receive/transmit device 23, which have different data transmission speeds, to be collectively used with the wireless signal transceiver controller 24, the communication controller 242 of the present invention is effective to control data transmission of the human input device (HID) 22 and the audio receive/transmit device 23. In other words, the audio data are transmitted from the USB interface controller 241 to the communication controller 242 in a parallel transmission manner, and then transmitted to the wireless signal transceiver 243 according to the transmission speeds required for the human input device (HID) 22 and the audio receive/transmit device 23, thereby accurately transmitting the data to the human input device (HID) 22 and the audio receive/transmit device 23.

Figure 7:
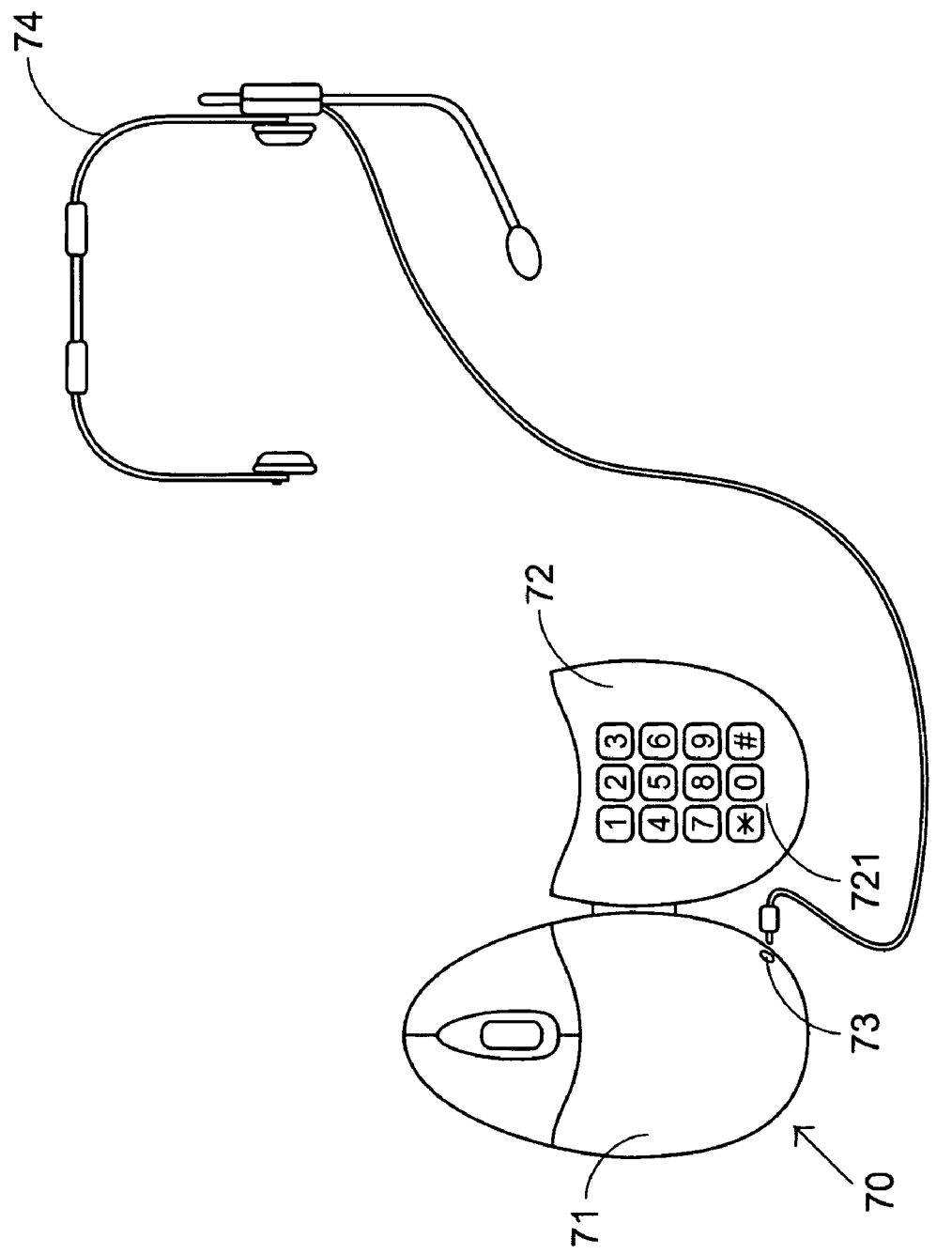
FIG. 7 is a schematic view illustrating another peripheral device used in the wireless peripheral system of the present invention.

By the way, in addition to the conventional mouse, keyboard and earphone/microphone device as shown in FIG. 4, other peripheral device can be included in the peripheral system of the present invention. A further embodiment of a peripheral system is illustrated in FIG. 7. In this embodiment, the peripheral device 70 of FIG. 7 comprises a wireless mouse main body 71, a cover plate 72 and an audio signal receiving hole 73. The cover plate 72 is pivotally coupled to the wireless mouse main body 71. The numerical keyboard 721 is arranged on the cover plate 72. Via the audio signal receiving hole 73, the signals generated from the microphone/earphone device 74 will be received by this peripheral device 70.

The peripheral device of FIG. 7 is somewhat different to those of FIG. 4. For example, the peripheral device 70 of FIG. 7 can be used to generate the HID signals and the audio signals. In a case that the wireless mouse main body 71 is covered with the cover plate 72, the peripheral device 70 of FIG. 7 serves as a wireless mouse. Whereas, once the terminal of the microphone/earphone device 74 is plugged in the audio signal receiving hole 73, the audio signal communication between the computer and this peripheral device 70 is implemented. In this circumstance, the user can listen to the songs played from the computer or answer the Skype PC-to-phone calls. Furthermore, once the cover plate 72 is lifted and the numerical keyboard 721 is exposed, the peripheral device 70 serves as an Internet phone. Therefore, when the user inputs the phone number of the receiver via the numerical keyboard 721, the user can dialogize with the receiver via the microphone/earphone device 74.

The present invention can further comprise a user operation interface for facilitating the user to operate the wireless peripheral system. This user operation interface may be an application program installed in the host computer 21. Alternatively, the user operation interface can be established according to the settings including (1) an Internet call notification setting, (2) a song playing schedule setting, (3) a broadcasting channel setting, (4) a battery capacity indication of the wireless peripheral device, and (5) an Internet phone dial setting, which will be illustrated as follows.

According to the Internet call notification setting, when an Internet call is detected by the computer, for example a Skype PC-to-phone call is notified, the information associated with this call can be directly displayed on the computer screen and this call will be transferred to the earphone worn on the user via the user operation interface.

According to the song playing schedule setting, the user operation interface can provide the song's operative panel on the computer screen when this peripheral device is employed. In this circumstance, the user can control the song broadcasting operations such as track selection, volume control, playback, stop, and so on.

According to the broadcasting channel setting, the user operation interface can provide a control panel of a broadcasting message transmitted from the Internet, for example the channel setting.

In views of the battery capacity indication, this user operation interface can indicate the battery capacity status of the wireless peripheral device on the computer screen.

According to the Internet phone dial setting, the user operation interface can provide a simple dial option menu, a telephone directory and the like. In this circumstance, the user needs not execute the application program for the Internet phone, for example the Skype program. Via this user operation interface, the dialing and communicating operations will be implemented.

It is noted that, however, those skilled in the art will readily observe that numerous modifications and alterations of the user operation interfaces may be made while retaining the teachings of the invention. Accordingly, the above disclosure should be limited only by the bounds of the following claims.

From the above description, the wireless peripheral system of the present invention is capable of communicating the computer with the human input device (HID) and the audio device by using a single wireless signal transceiver controller. Since the user can input control signals for the computer, listen to songs and make PC-to-phone calls by using the wireless peripheral system of the present invention, flexibility and convenience thereof are enhanced. Moreover, since only one wireless signal transceiver controller is required, the additional USB ports of the computer are reserved for other peripheral devices. By the way, when compared with the prior art, using only one wireless signal transceiver controller is more cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless peripheral system for use with a computer, said wireless peripheral system being communicated with a connection port of said computer and comprising:

a single wireless signal transceiver controller electrically connected to said connection port of said computer, and comprising a computer interface controller electrically connected to said connection port of said computer, a communication controller electrically connected to said computer interface controller and a wireless signal transceiver electrically connected to said communication controller, wherein data are transmitted from said computer interface controller to said communication controller in a parallel transmission manner, transmitted from said communication controller to said wireless signal transceiver in a serial transmission manner, and then transmitted from said wireless signal transceiver to outsides of said wireless signal transceiver controller via a wireless transmission manner;

a first wireless peripheral device in communication with said computer via said wireless signal transceiver controller so as to transmit computer pointing signals between said first wireless peripheral device and said computer; and a second wireless peripheral device in communication with said computer via said wireless signal transceiver controller so as to transmit audio signals between said second wireless peripheral device and said computer, wherein the wireless signal transceiver controller comprises a single computer interface controller, a single communication controller and a single wireless signal transceiver, wherein said connection port of said computer is a full speed universal serial bus (USB 2.0) connection port, and said computer interface controller is a full speed USB micro controller.

2. The wireless peripheral system for use with a computer according to claim 1 wherein said first wireless peripheral device is a mouse.

3. The wireless peripheral system for use with a computer according to claim 1 wherein said first wireless peripheral device includes a mouse and a computer keyboard.

4. The wireless peripheral system for use with a computer according to claim 1 wherein said second wireless peripheral device includes an earphone, and said audio signals are songs.

5. The wireless peripheral system for use with a computer according to claim 1 wherein said second wireless peripheral device includes an earphone and a microphone, and said audio signals are Internet phone communicating signals.

6. The wireless peripheral system for use with a computer according to claim 1 wherein said computer further comprises a user operation interface.

7. The wireless peripheral system for use with a computer according to claim 6 wherein said user operation interface comprises an Internet call notification setting, a song playing schedule setting, a broadcasting channel setting, a battery capacity indication of the wireless peripheral device, and an Internet phone dial setting.

8. A wireless peripheral system for use with a computer, said wireless peripheral system being communicated with a connection port of said computer and comprising:

a single wireless signal transceiver controller electrically connected to said connection port of said computer, and comprising a computer interface controller electrically connected to said connection port of said computer, a communication controller electrically connected to said computer interface controller and a wireless signal transceiver electrically connected to said communication controller, wherein data are transmitted from said computer interface controller to said communication controller in a parallel transmission manner, transmitted from said communication controller to said wireless signal transceiver in a serial transmission manner, and then transmitted from said wireless signal transceiver to outsides of said wireless signal transceiver controller via a wireless transmission manner; and a wireless peripheral device in communication with said computer via said wireless signal transceiver controller for use with a computer so as to transmit computer pointing signals and audio signals between said wireless peripheral device and said computer, wherein the wireless signal transceiver controller comprises a single computer interface controller, a single communication controller and a single wireless signal transceiver, wherein said connection port of said computer is a full speed universal serial bus (USB 2.0) connection port, and said computer interface controller is a full speed USB micro controller.

9. The wireless peripheral system according to claim 8 wherein said wireless peripheral device comprises:
   a wired earphone; and
   a mouse comprising a numerical keyboard, an audio signal encoder and an audio signal receiving hole, wherein said earphone is electrically connected to said mouse when plugged in said audio signal receiving hole.

10. The wireless peripheral system according to claim 9 wherein said wireless peripheral device comprises:
    a wired earphone;
    a microphone coupled to said earphone; and
    a mouse comprising a numerical keyboard, an audio signal encoder and an audio signal receiving hole, wherein said earphone is electrically connected to said mouse when plugged in said audio signal receiving hole.

11. The wireless peripheral system according to claim 10 wherein said wireless peripheral device further comprises a keyboard.

12. The wireless peripheral system according to claim 9 wherein said wireless peripheral device further comprises a keyboard.

13. The wireless peripheral system according to claim 8 wherein said audio signals are songs or Internet phone communicating signals.

14. The wireless peripheral system according to claim 8 wherein said computer further comprises a user operation interface.

15. The wireless peripheral system according to claim 14 wherein said user operation interface comprises an Internet call notification setting, a song playing schedule setting, a broadcasting channel setting, a battery capacity indication of the wireless peripheral device, and an Internet phone dial setting.

* * * * *